United States Patent [19]
Shirota et al.

[11] Patent Number: 5,782,967
[45] Date of Patent: Jul. 21, 1998

[54] INK-JET INK CONTAINING PHYTIC ACID, AND INK JET RECORDING METHOD AND INK-JET INSTRUMENT USING THE SAME

[75] Inventors: Koromo Shirota, Kawasaki; Masahiro Haruta, Tokyo; Shoji Koike, Yokohama; Tomoya Yamamoto, Kawasaki; Mariko Suzuki, Yokohama; Shinichi Hakamada, Kawasaki, all of Japan

[73] Assignee: Canon Kabushiki Kaisha, Tokyo, Japan

[21] Appl. No.: 754,068

[22] Filed: Nov. 20, 1996

[30] Foreign Application Priority Data

Nov. 30, 1995 [JP] Japan ................................ 7-334361

[51] Int. Cl.⁶ ................................................ C09D 11/02
[52] U.S. Cl. ............................... 106/31.58; 106/31.86
[58] Field of Search ........................ 347/36, 100, 106; 106/31.27, 31.58, 31.6, 31.86

[56] References Cited

U.S. PATENT DOCUMENTS

| | | | |
|---|---|---|---|
| 5,062,892 | 11/1991 | Halko | 106/22 |
| 5,579,038 | 11/1996 | Kimura | 347/36 |
| 5,635,970 | 6/1997 | Shirota et al. | 347/106 |

FOREIGN PATENT DOCUMENTS

| | | |
|---|---|---|
| 0 317362A2 | 5/1989 | European Pat. Off. |
| 54-59936 | 5/1979 | Japan . |
| 58-152071 | 9/1983 | Japan . |
| 2-018472 | 1/1990 | Japan . |
| 3-160070 | 7/1991 | Japan . |
| 901932 | 7/1962 | United Kingdom . |

*Primary Examiner*—Helene Klemanski
*Attorney, Agent, or Firm*—Fitzpatrick, Cella, Harper & Scinto

[57] ABSTRACT

Disclosed herein is an ink-jet ink comprising a recording agent and a liquid medium dissolving and/or dispersing the recording agent therein, wherein the ink contains phytic acid and/or a salt thereof.

12 Claims, 3 Drawing Sheets

INK-JET INK CONTAINING PHYTIC ACID, AND INK JET RECORDING METHOD AND INK-JET INSTRUMENT USING THE SAME

BACKGROUND OF THE INVENTION

1. Field of the Invention

The present invention relates to an ink-jet ink, and an ink-jet recording method and instruments using such an ink, and more particularly to an ink-jet ink, an ink-jet recording method, a recording unit, an ink-jet recording apparatus and an ink cartridge which permit recording with high definition and high image quality on non-coated paper such as paper for copying, paper for reporting, bond paper and continuous business forms, i.e., so-called plain paper, which are commonly used in offices and homes, and also on cloths, to say nothing of coated paper specially prepared for ink-jet recording.

2. Related Background Art

Inks with greatly various manners of being composed have been hitherto reported in respect of ink-jet inks. In particular, in recent years, detailed researches and developments have been made from various aspects such as compositions and physical properties of inks so that good recording can be conducted even on plain paper such as paper for copying, paper for reporting, notepaper and letter paper, which are commonly used in offices, and also on cloths.

On the other hand, various systems have also been proposed on ink-jet recording methods, including a system in which droplets charged are continuously generated to use a part of the droplets in recording, a system in which signals are applied to a recording head having piezoelectric elements, and droplets of a recording liquid (ink) are generated in accordance with the signals, thereby conducting recording, and a system in which thermal energy corresponding to recording signals is applied to an ink in the interior of a recording head, and droplets of the ink are generated by the energy, thereby conducting recording.

In particular, a system of the type that an ink is ejected by a bubbling phenomenon of the ink caused by thermal energy as described in Japanese Patent Application Laid-Open No. 54-59936 is easy to achieve the high integration and high density assembly of nozzles and hence has recently attracted particular attention. Since the system makes good use of a unique bubbling phenomenon, however, still severer conditions are required of inks to be used. Among others, the performance most required of inks for the ink-jet recording is liquid stability that no foreign matter deposits on a heating head due to changes in temperature while recording is being conducted with such an ink. However, the conventional inks have involved a problem that when the inks are ejected over a long period of time, foreign matter deposits on a surface of a heating head, and so the ejection of the inks is stopped.

Various investigations have been already made on this problem. For example, Japanese Patent Application Laid-Open No. 3-160070 discloses an attempt to solve the problem of the deposition of foreign matter by a use of an oxo anion contained in an ink.

The present inventors have carried out a detailed investigation as to the cause that foreign matter deposits. As a result, it has been found that the cause of the deposition can be classified into the following three cases:

(1) a case caused by a recording agent itself in an ink;

(2) a case where a reaction intermediate of an organic substance such as a recording agent or a liquid medium, and the like are present as organic impurities; and (3) a case of inorganic impurities which are entered upon synthesis of a dye and preparation of an ink.

In the case (3) among these, a great difference arises in deposition according to the kinds of inorganic impurities mixed. It has been known that in particular, silicon compounds contained in the form of a silicate ion or colloidal silica form one of serious causes that foreign matter deposits.

However, the investigation by the present inventors has revealed that the attempt disclosed in Japanese Patent Application Laid-Open No. 3-160070 exhibits a certain effect in case of causes (1) and (2), but cannot prevent the deposition of the foreign matter in case of cause (3), particularly, in the case where the silicon compounds form the cause of the deposition.

SUMMARY OF THE INVENTION

It is accordingly an object of the present invention to provide an ink-jet ink and an ink-jet recording method, which can solve the above problems involved in the prior art and permit stable ejection without causing deposition of foreign matter on a surface of a heating head even when ink-jet recording is conducted over a long period of time.

The above object can be achieved by the present invention described below.

According to the present invention, there is thus provided an ink-jet ink comprising a recording agent and a liquid medium dissolving and/or dispersing the recording agent therein, wherein the ink contains phytic acid and/or a salt thereof.

According to the present invention, there is also provided an ink-jet recording method comprising ejecting droplets of an ink out of an orifice by utilizing thermal energy in accordance with recording signals to conduct recording on a recording medium, wherein the ink described above is used as said ink.

According to the present invention, there is further provided a recording unit comprising an ink container portion containing an ink therein and a head from which the ink is ejected in the form of ink droplets, wherein said ink is the ink described above.

According to the present invention, there is still further provided an ink cartridge comprising an ink container portion containing an ink therein, wherein said ink is the ink described above.

According to the present invention, there is yet still further provided an ink-jet recording apparatus comprising a recording unit having an ink container portion containing an ink therein and a head from which the ink is ejected in the form of ink droplets, wherein said ink is the ink described above.

DESCRIPTION OF THE PREFERRED EMBODIMENTS

Figure 1:
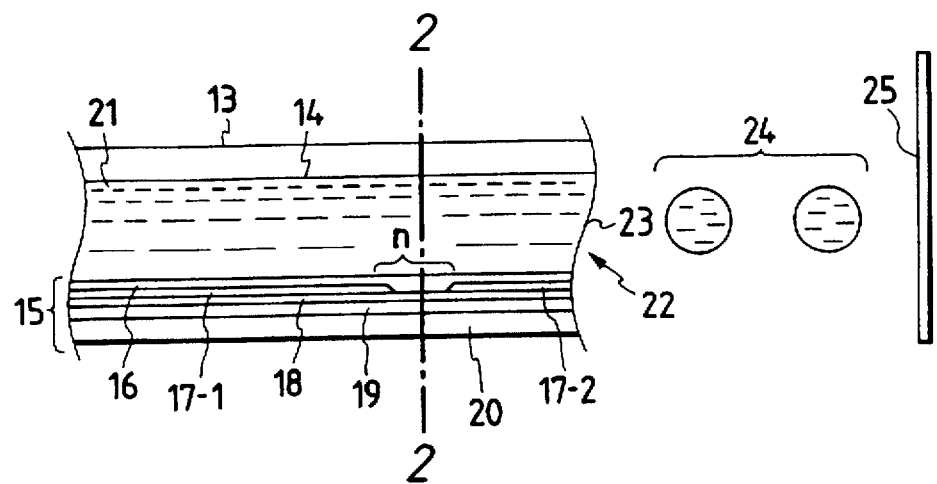
FIG. 1 is a longitudinal cross-sectional view of a head of an ink-jet recording apparatus.

The detailed research of the present inventors has revealed that one of causes that foreign matter deposits on a surface of a heating head is the presence of silicon compounds contained in an ink. It has therefore been found that when phytic acid and/or a salt thereof is contained in such an ink as an additive for enhancing the stability of such a silicon compound in the ink and increasing thermal stability of the ink on a heating head, ink-jet recording can be stably conducted over a long period of time.

The present invention will hereinafter be described in more detail by the following preferred embodiments.

The ink according to the present invention is prepared by adding phytic acid and/or a salt thereof to a conventionally-known ink-jet ink. This phytic acid may be either hydrate or non-hydrate thereof. The salt thereof may be a salt with an alkali metal such as sodium, potassium or lithium, ammonia, or an organic amine. The amount of silicon compounds mixed into an ink may vary, and they may also be various kinds and forms such as a silicate ion and colloidal silica. However, the content of phytic acid and/or the salt thereof in an ink may be controlled according to the amount of silicon compounds in the ink. The necessary amount of phytic acid and/or the salt thereof varies with individual inks. Therefore, phytic acid and/or the salt thereof may be added in a proportion ranging from about 0.001 to 30% by weight, preferably from 0.005 to 25% by weight, more preferably from 0.01 to 20% by weight based on the total weight of the ink. It goes without saying that these phytic acid additives have their effects of preventing the deposition of foreign matter on impurities other than the silicon compounds.

Examples of coloring matter making up the ink according to the present invention include direct dyes, acid dyes, food dyes, basic dyes, reactive dyes, disperse dyes, vat dyes, water-soluble vat dyes, reactive disperse dyes, oil-soluble dyes and various kinds of pigments. In particular, when a disperse dye or a pigment is used and dispersed in an ink, the dispersion treatment is generally performed by means of glass beads. In this case, however, it is considered that a silicon element is often mixed into the ink upon the dispersion. In the case where the silicon element is mixed into the ink by such a treatment, the effect of the present invention is exhibited to a more marked extent.

Examples of a dispersing agent serving to disperse the disperse dye or pigment in a medium for ink include so-called dispersants, surfactants and resins.

Either anionic dispersant or surfactant or nonionic dispersant or surfactant may be used as the dispersant or surfactant. Examples of the anionic dispersant or surfactant include fatty acid salts, salts of alkylsulfates, alkylbenzenesulfonates, alkylnaphthalene-sulfonates, dialkylsulfosuccinates, salts of alkylphosphates, naphthalene sulfonate formaldehyde condensation products, salts of polyoxyethylene alkylsulfates and substituted derivatives of these compounds. Examples of the nonionic dispersant or surfactant include polyoxyethylene alkyl ethers, polyoxyethylene alkylphenyl ethers, polyoxyethylene fatty acid esters, sorbitan fatty acid esters, polyoxyethylene sorbitan fatty acid esters, polyoxyethylenealkylamines, glycerol fatty acid esters, oxyethylene-oxypropylene block copolymers, acetylene glycol and ethylene oxide adducts thereof, and substituted derivatives of these compounds. Of these, the naphthalene sulfonate formaldehyde condensation products and derivatives (particularly, alkylated products) of the condensates, and acetylene glycol and ethylene oxide adducts thereof are particularly preferred.

Examples of resinous dispersants include block copolymers, random copolymers and graft copolymers composed of at least two monomers (at least one monomer being hydrophilic) selected from the group consisting of styrene and derivatives thereof, vinylnaphthalene and derivatives thereof, aliphatic alcohol esters of $\alpha,\beta$-unsaturated carboxylic acids, (meth)acrylic acid and derivatives thereof, maleic acid and derivatives thereof, itaconic acid and derivatives thereof, fumaric acid and derivatives thereof, vinyl acetate and derivatives thereof, vinyl alcohol and derivatives thereof, vinyl-pyrrolidone and derivatives thereof, and acrylamide and derivatives thereof, and salts of these copolymers. These resins are preferably alkali-soluble resins which dissolve in an aqueous solution of a base. Of these, water-soluble polymers having a carboxyl group or a salt thereof on their side chains are particularly preferred.

Phytic acid or the salt thereof (examples of the salt include salts with sodium, potassium, lithium, ammonium, triethanolamine and the like) by which the present invention is characterized has a very strong affinity for water. Therefore, the ink according to the present invention preferably contains water as a component. Water is contented in a proportion ranging from 20 to 95% by weight, preferably from 40 to 95% by weight, more preferably from 60 to 95% by weight based on the total weight of the ink.

As a liquid medium, a water-soluble organic solvent may be used in combination with water to exhibit the effect of the present invention to a more marked extent. Examples of such a solvent include monohydric alcohols such as methanol, ethanol and isopropyl alcohol; ketones and ketone alcohols such as acetone and diacetone alcohol; ethers such as tetrahydrofuran and dioxane; addition polymerization products of oxyethylene or oxypropylene, such as diethylene glycol, triethylene glycol, tetraethylene glycol, dipropylene glycol, tripropylene glycol, polyethylene glycol and polypropylene glycol; alkylene glycols the alkylene moiety of which has 2 to 6 carbon atoms, such as ethylene glycol, propylene glycol, triethylene glycol, butylene glycol and hexylene glycol; triols such as 1,2,6-hexanetriol; thiodiglycol; bis(hydroxyethyl)sulfone; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; lower dialkyl ethers of polyhydric alcohols, such as triethylene glycol dimethyl (or diethyl) ether and tetraethylene glycol dimethyl (or diethyl) ether; sulfolane; N-methyl-2-pyrrolidone; and 1,3-dimethyl-2-imidazolidinone.

A content of the water-soluble organic solvent in the ink is generally within a range of from 0 to 50% by weight, preferably from 2 to 45% by weight based on the total weight of the ink.

The water-soluble organic solvents may be used either singly or in any combination of these solvents when they are used in combination with water. Preferred water-soluble organic solvents are the monohydric alcohols, the ketones, bis(hydroxyethyl)sulfone, glycerol, ethylene glycol, diethylene glycol, triethylene glycol, tetraethylene glycol, thiodiglycol, propylene glycol, dipropylene glycol, tripropylene glycol and derivatives thereof (in particular, alkyl ethers thereof).

To the ink according to the present invention, other various defoaming agents, viscosity modifiers, surface tension modifiers, pH-adjustors and the like may be added as needed. Mono-, di- and tricarboxylic acids, their salts and urea have an action of making the effect of the present invention more marked.

Figure 2:
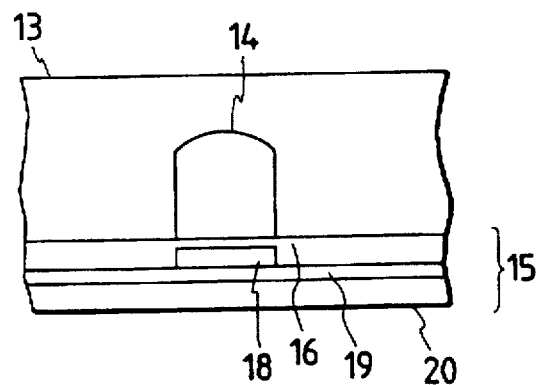
FIG. 2 is a transverse cross-sectional view of the head of the ink-jet recording apparatus.
Figure 3:
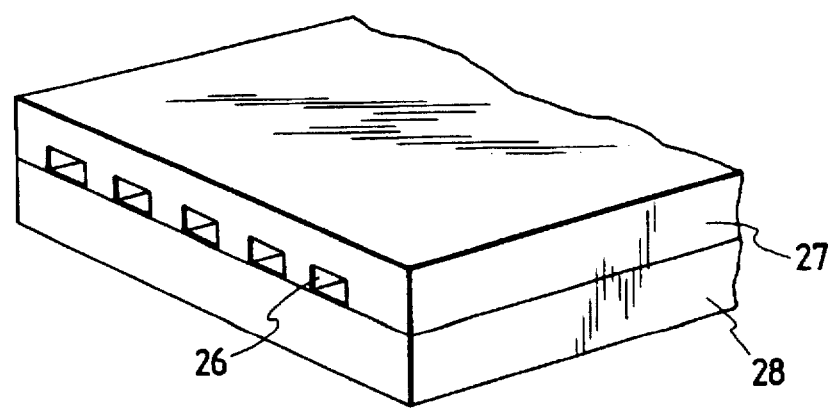
FIG. 3 is a perspective view of the appearance of a multi-head which is an array of such heads as shown in FIG. 1.

As a preferred apparatus by which recording is conducted with the ink according to the present invention, may be mentioned an apparatus in which thermal energy corresponding to recording signals is applied to an ink in the interior of a recording head, and droplets of the ink are generated by the thermal energy. This apparatus will hereinafter be described. Examples of the construction of a head, which is a main component of the apparatus, are illustrated in FIGS. 1, 2 and 3.

A head 13 is formed by bonding a glass, ceramic or plastic plate or the like having a groove 14 through which an ink is passed, to a heating head 15, which is used for thermal recording (the drawings show a thin film head to which, however, the invention is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

An ink 21 comes up to an ejection orifice (a minute opening) 22 and forms a meniscus 23 due to a pressure P.

Now, upon application of electric signals to the electrodes 17-1 and 17-2, the heating head 15 rapidly generates heat at the region shown by n to form bubbles in the ink 21 which is in contact with this region. The meniscus 23 of the ink is projected by the pressure thus produced, and the ink 21 is ejected from the orifice 22 to a recording medium 25 in the form of minute droplets 24.

FIG. 3 illustrates an appearance of a multi-head composed of an array of a number of heads as shown in FIG. 1. The multi-head is formed by closely bonding a glass plate 27 having a number of grooves 26 to a heating head 28 similar to the head as illustrated in FIG. 1.

Incidentally, FIG. 1 is a cross-sectional view of the head 13 taken along the flow path of ink, and FIG. 2 is a cross-sectional view taken along line 2—2 in FIG. 1.

Figure 4:
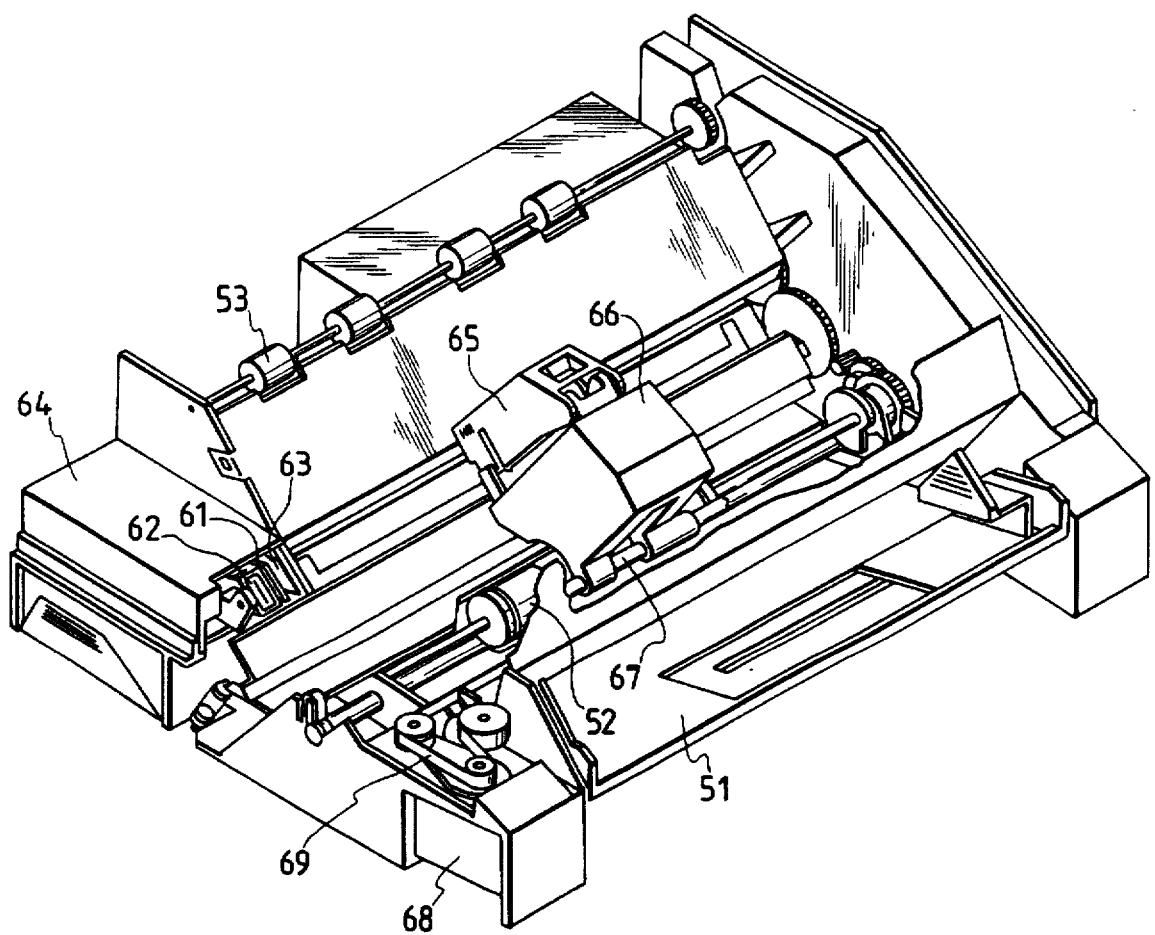
FIG. 4 is a perspective view of an illustrative ink-jet recording apparatus.

FIG. 4 illustrates an example of an ink-jet recording apparatus in which such a head has been incorporated.

In FIG. 4, reference numeral 61 designates a blade serving as a wiping member, one end of which is a stationary end held by a blade-holding member to form a cantilever. The blade 61 is provided at a position adjacent to a region in which a recording head operates, and in this embodiment, is held in such a form that it protrudes into the course through which the recording head is moved.

Reference numeral 62 indicates a cap for a face of ejection openings of the recording head 65, which is provided at a home position adjacent to the blade 61, and is so constructed that it moves in a direction perpendicular to a direction in which the recording head is moved, and comes into contact with the face of ejection openings to cap it. Reference numeral 63 denotes an ink-absorbing member provided adjoiningly to the blade 61 and, similar to the blade 61, held in such a form that it protrudes into the course through which the recording head is moved.

The above-described blade 61, cap 62 and absorbing member 63 constitute an ejection-recovery portion 64, where the blade 61 and absorbing member 63 remove water, dust and/or the like from the face of the ink-ejecting openings.

Reference numeral 65 designates the recording head having an ejection-energy-generating means and serving to eject the ink onto a recording medium set in an opposing relation to the ejection opening face provided with the ejection openings to conduct recording. Reference numeral 66 indicates a carriage on which the recording head 65 is mounted so that the recording head 65 can be moved.

The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a feeding part from which the recording media are separately inserted, and feed rollers driven by a motor (not illustrated), respectively. With such a construction, the recording medium is fed to the position opposite to the ejection opening face of the recording head 65, and discharged from a discharge section provided with discharge rollers 53 with the progress of recording.

In the above construction, the cap 62 in the head recovery portion 64 is receded from the path of motion of the recording head 65 when the recording head 65 is returned to its home position, for example, after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head 65.

When the recording head 65 is moved from its home position to the position at which recording is started, the cap 62 and the blade 61 are at the same positions as the positions for the wiping as described above. As a result, the ejection opening face of the recording head 65 is also wiped at the time of this movement.

The above movement of the recording head 65 to its home position is made not only when the recording is completed or the recording head is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
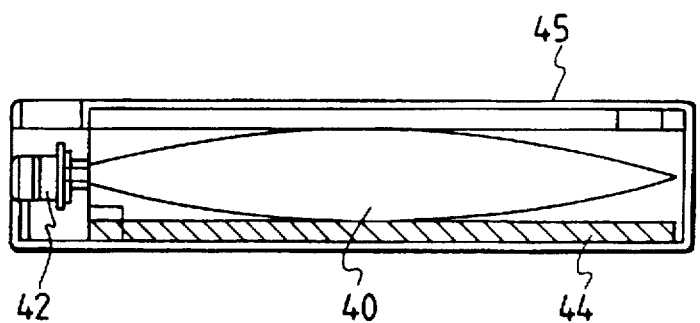
FIG. 5 is a longitudinal cross-sectional view of an ink cartridge.

FIG. 5 illustrates an exemplary ink cartridge 45 in which an ink to be fed to the head through an ink-feeding member, for example, a tube is contained.

Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink.

It is preferred in the present invention that the ink container portion is formed of a polyolefin, in particular, polyethylene, at its surface with which the ink comes into contact.

The ink-jet recording apparatus used in the present invention are not limited to the apparatus as described above in which the head and the ink cartridge are separately provided. Therefore, a device in which these members are integrally formed as shown in FIG. 6 can also be preferably used.

Figure 6:
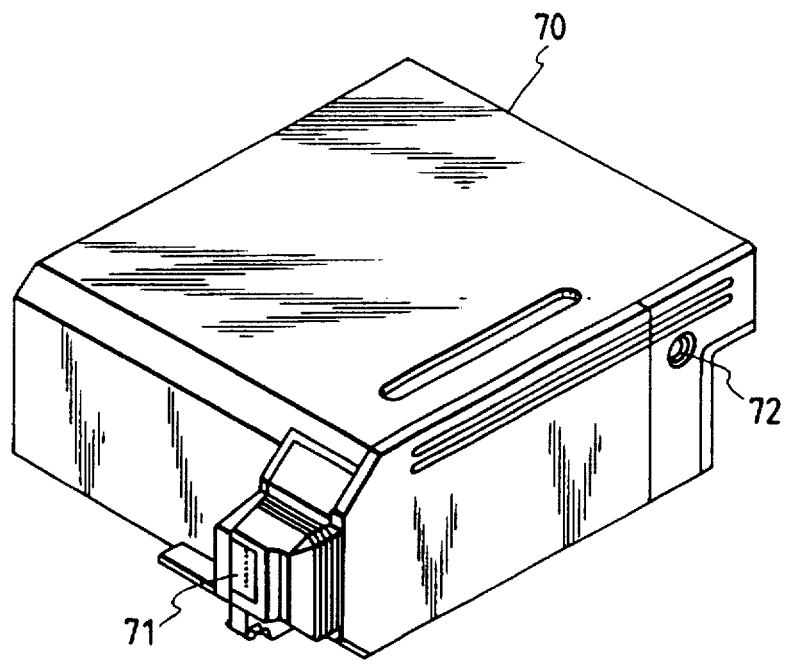
FIG. 6 is a perspective view of an illustrative recording unit.

In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices.

In the present invention, polyurethane is preferably used as a material for the ink-absorbing member. Reference numeral 72 indicates an air passage for communicating the interior of the recording unit 70 with the atmosphere. This recording unit 70 is used in place of the recording head shown in FIG. 4, and is detachably installed on the carriage 66.

The present invention will hereinafter be described specifically by the following Examples and Comparative Examples. Incidentally, all designations of "part" or "parts" and "%" as will be used in the following examples mean part or parts by weight and % by weight unless expressly noted.

EXAMPLES AND COMPARATIVE EXAMPLES
Preparation of Disperse Dye Dispersions (I, II and III):

| | |
|---|---|
| β-Naphthalene sulfonate formaldehyde condensation product | 20 parts |
| Sodium lignin sulfonate | 5 parts |
| Ion-exchanged water | 55 parts |
| Ethylene glycol | 20 parts. |

The above components were mixed into a solution. To portions of the solution, were separately added each 8 parts of the following disperse dyes to premix the respective components for 30 minutes. Thereafter, the resulting premixes were subjected to a dispersion treatment under the following conditions.

Disperse dye:
C.I. Disperse Yellow 198 (for Disperse Dye Dispersion I)
C.I. Disperse Red 152 (for Disperse Dye Dispersion II)
C.I. Disperse Blue 60 (for Disperse Dye Dispersion III)
Dispersing machine:
sand grinder (manufactured by Igarashi Kikai K. K.)
Grinding medium: glass beads (diameter: 1 mm)
Packing rate of grinding medium: 50% (by volume)
Grinding time:
Disperse Dye Dispersion I: 12 hours
Disperse Dye Dispersion II: 15 hours
Disperse Dye Dispersion III: 18 hours The thus-treated mixtures were further subjected to a centrifugal treatment (12,000 rpm, 10 minutes) to remove coarse particles, thereby obtaining Disperse Dye Dispersions I, II and III.
Preparation of Inks according to Examples:

| [Preparation of Ink A] | |
|---|---|
| Disperse Dye Dispersion I | 60 parts |
| Bis(hydroxyethyl)sulfone | 20 parts |
| Phytic acid | 0.5 part |
| Ion-exchanged water | 19.5 parts. |

All the above components were mixed, and the resultant liquid mixture was filtered through a Fluoropore filter having a pore size of 2.5 μm, thereby obtaining Ink-Jet Ink A.

| [Preparation of Ink B] | |
|---|---|
| Disperse Dye Dispersion I | 60 parts |
| Bis(hydroxyethyl)sulfone | 20 parts |
| Diethylene glycol | 4 parts |
| Phytic acid | 0.2 part |
| Ion-exchanged water | 15.8 parts. |

All the above components were mixed, and the resultant liquid mixture was filtered through a Fluoropore filter having a pore size of 2.5 μm, thereby obtaining Ink-Jet Ink B.

| [Preparation of Ink C] | |
|---|---|
| Disperse Dye Dispersion I | 80 parts |
| Thiodiglycol | 15 parts |
| Phytic acid | 1 part |
| Ion-exchanged water | 4 parts. |

All the above components were mixed, and the resultant liquid mixture was filtered through a Fluoropore filter having a pore size of 2.5 μm, thereby obtaining Ink-Jet Ink C.

| [Preparation of Ink D] | |
|---|---|
| Disperse Dye Dispersion II | 70 parts |
| Thiodiglycol | 15 parts |
| Phytic acid | 0.5 part |
| Trisodium citrate | 0.5 part |
| Ion-exchanged water | 14 parts. |

All the above components were mixed, and the resultant liquid mixture was filtered through a Fluoropore filter having a pore size of 2.5 μm, thereby obtaining Ink-Jet Ink D.

| [Preparation of Ink E] | |
|---|---|
| Disperse Dye Dispersion II | 70 parts |
| Thiodiglycol | 15 parts |
| Phytic acid | 2 parts |
| Ion-exchanged water | 13 parts. |

All the above components were mixed, and the resultant liquid mixture was filtered through a Fluoropore filter having a pore size of 2.5 μm, thereby obtaining Ink-Jet Ink E.

| [Preparation of Ink F] | |
|---|---|
| Solophenyl Red 3BL (trade name, product of CIBA-GEIGY AG) | 5 parts |
| Diethylene glycol | 20 parts |
| Phytic acid | 0.5 part |
| Ion-exchanged water | 74.5 parts. |

All the above components were mixed, and the resultant liquid mixture was filtered through a Fluoropore filter having a pore size of 2.5 μm, thereby obtaining Ink-Jet Ink F.
Preparation of Inks according to Comparative Examples:

| [Preparation of Ink G] | |
|---|---|
| Disperse Dye Dispersion I | 80 parts |
| Thiodiglycol | 15 parts |
| Ion-exchanged water | 5 parts. |

All the above components were mixed, and the resultant liquid mixture was filtered through a Fluoropore filter having a pore size of 2.5 μm, thereby obtaining Ink-Jet Ink G.

| [Preparation of Ink H] | |
|---|---|
| Disperse Dye Dispersion II | 70 parts |
| Thiodiglycol | 15 parts |
| Ion-exchanged water | 15 parts. |

All the above components were mixed, and the resultant liquid mixture was filtered through a Fluoropore filter having a pore size of 2.5 μm, thereby obtaining Ink-Jet Ink H.

[Preparation of Ink I]

| Disperse Dye Dispersion II | 70 parts |
|---|---|
| Thiodiglycol | 15 parts |
| Trisodium citrate | 0.5 part |
| Ion-exchanged water | 14.5 parts. |

All the above components were mixed, and the resultant liquid mixture was filtered through a Fluoropore filter having a pore size of 2.5 µm, thereby obtaining Ink-Jet Ink I.

[Preparation of Ink J]

| Disperse Dye Dispersion II | 70 parts |
|---|---|
| Thiodiglycol | 15 parts |
| Pyrophosphoric acid | 0.2 part |
| Ion-exchanged water | 14.8 parts. |

All the above components were mixed, and the resultant liquid mixture was filtered through a Fluoropore filter having a pore size of 2.5 µm, thereby obtaining Ink-Jet Ink J.

[Preparation of Ink K]

| Solophenyl Red 3BL (trade name, product of CIBA-GEIGY AG) | 5 parts |
|---|---|
| Diethylene glycol | 20 parts |
| Ion-exchanged water | 75 parts. |

All the above components were mixed, and the resultant liquid mixture was filtered through a Fluoropore filter having a pore size of 2.5 µm, thereby obtaining Ink-Jet Ink K.

[Evaluation]

Using each of the Inks (A to K) obtained above, printing was conducted by means of an ink-jet recording apparatus (BJC600, trade name, manufactured by Canon Inc.) having an On-Demand type multi-recording head, which ejects an ink by applying thermal energy in accordance with recording signals to the ink, on A4-sized plain paper according to a pattern that printing was continuously performed through four nozzles, thereby checking the number of sheets of paper printed until two nozzles of the four nozzles became impossible to eject (printing 158,400 dots per sheet of A4-sized paper). The results are shown in Table 1.

TABLE 1

|  | Ink used | Ejection stability |
|---|---|---|
| Example 1 | A | Not occurred up to 700 sheets |
| Example 2 | B | Not occurred up to 700 sheets |
| Example 3 | C | Not occurred up to 700 sheets |
| Example 4 | D | Not occurred up to 700 sheets |
| Example 5 | E | Not occurred up to 700 sheets |
| Example 6 | F | Not occurred up to 700 sheets |
| Comparative Example 1 | G | 30 sheets |
| Comparative Example 2 | H | 50 sheets |
| Comparative Example 3 | I | 300 sheets |
| Comparative Example 4 | J | 100 sheets |
| Comparative Example 5 | K | 200 sheets |

As described above, the inks according to the present invention sufficiently solve the problems involved in the prior art and are particularly suitable for use as inks for an ink-jet recording system using thermal energy, which most dislikes the occurrence of a deposit on a heating head, so that images having excellent quality can be stably provided.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink-jet ink comprising a recording agent and a liquid medium which performs at least one of dissolving and dispersing the recording agent therein, wherein the ink contains at least one of phytic acid and a salt thereof.

2. The ink-jet ink according to claim 1, wherein the content of phytic acid and/or the salt thereof falls within a range of from 0.001 to 30% by weight based on the total weight of the ink.

3. The ink-jet ink according to claim 1, wherein the liquid medium comprises water.

4. The ink-jet ink according to claim 1, wherein the liquid medium comprises a water-soluble organic solvent.

5. The ink-jet ink according to claim 1, wherein the recording agent is a dispersion of a pigment or a disperse dye.

6. An ink-jet recording method comprising the steps of:

providing an ink according to any one of claims 1 to 5, ejecting droplets of the ink out of an orifice of a recording head by use of thermal energy in accordance with recording signals, and conducting recording on a recording medium.

7. The ink-jet recording method according to claim 6, wherein the recording medium is cloth.

8. A recording unit comprising an ink container portion containing an ink therein and a head from which the ink is ejected in the form of ink droplets, wherein said ink is the ink according to any one of claims 1 to 5.

9. The recording unit according to claim 8, wherein the head is a head which applies thermal energy to the ink to eject droplets of the ink.

10. An ink cartridge comprising an ink container portion containing an ink therein, wherein said ink is the ink according to any one of claims 1 to 5.

11. An ink-jet recording apparatus comprising a recording unit having an ink container portion containing an ink therein and a head from which the ink is ejected in the form of ink droplets, wherein said ink is the ink according to any one of claims 1 to 5.

12. The ink-jet recording apparatus according to claim 11, wherein the head is a head which applies thermal energy to the ink to eject droplets of the ink.

* * * * *